(12) United States Patent
Papaefstathiou et al.

(10) Patent No.: US 7,548,843 B2
(45) Date of Patent: Jun. 16, 2009

(54) SIMULATION OF DISTRIBUTED NETWORKS

(75) Inventors: Efstathios Papaefstathiou, Redmond, WA (US); John M. Oslake, Seattle, WA (US); Pavel A. Dournov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 11/401,077

(22) Filed: Apr. 10, 2006

(65) Prior Publication Data

US 2007/0239420 A1 Oct. 11, 2007

(51) Int. Cl.
 *G06F 9/44* (2006.01)
(52) U.S. Cl. ............... 703/21; 703/14; 703/22; 709/226; 709/229
(58) Field of Classification Search ............ 703/14, 703/13, 21, 22; 709/223–229
See application file for complete search history.

(56) References Cited

U.S. PATENT DOCUMENTS 5,809,282 A * 9/1998 Cooper et al. ............... 709/226
7,200,545 B2 * 4/2007 Lines et al. .................. 703/21

OTHER PUBLICATIONS

De et al., S. Dynamic Multipath Routing (DMPR): AN Approach to Improve Resource Utilization in Networks for Real-Time Traffic, Modeling, Analysis, and Simulation of Computer and Telecommunications Systems, Aug. 2001, pp. 23-30.*
Thakore et al., D. Routing with Persistent Link Modeling in Intermittently Connected Wireless Networks, IEEE Military Communications Conference, Oct. 2005, pp. 461-467.*
U.S. Appl. No. 11/394,473, filed Mar. 31, 2006, Peterson, et al.
U.S. Appl. No. 11/394,483, filed Mar. 31, 2006, Papaefstathiou, et al.
U.S. Appl. No. 11/394,474, filed Mar. 31, 2006, Papaefstathiou, et al.
U.S. Appl. No. 11/394,945, filed Mar. 31, 2006, Papaefstathiou, et al.
U.S. Appl. No. 11/105,251, filed Apr. 13, 2005, Dournov, et al.

* cited by examiner

*Primary Examiner*—Russell Frejd
(74) *Attorney, Agent, or Firm*—Workman Nydegger (57) ABSTRACT

Simulating network connections. A method includes generating a transaction by simulating a method model of a service model. The transaction includes representations of network interactions. A sequence of actions is created. The actions define network hardware activities including network actions performed by one or more source computer models, one or more network models, and one or more destination computer models. The sequence of actions is applied to network hardware device models to simulate network connectivity.

24 Claims, 8 Drawing Sheets

SIMULATION OF DISTRIBUTED NETWORKS

BACKGROUND

Background and Relevant Art

Computer and computing systems have affected nearly every aspect of modern living. Computers are generally involved in work, recreation, healthcare, transportation, entertainment, household management, etc. The functionality of computers has also been enhanced by their ability to be interconnected through various network connections.

Computers systems can be interconnected in large network configurations so as to provide additional functionality. For example, one typical network configuration is a configuration of computer systems interconnected to perform e-mail functionality. In one particular example, an e-mail server acts as a central location where users can send and retrieve emails. For example, a user may send an e-mail to the e-mail server with instructions to the e-mail server to deliver the message to another user connected to the e-mail server. Users can also connect to the e-mail server to retrieve messages that have been sent to them. Many e-mail servers are integrated into larger frameworks to provide functionality for performing scheduling, notes, tasks, and other activities.

Each of the computer systems within a network environment has certain hardware limitations. For example, network cards that are used to communicate between computer systems have a limited amount of bandwidth meaning that communications can only take place at or below a predetermined threshold rate. Computer processors can only process a given amount of instructions in a given time period. Hard disk drives are limited in the amount of data that can be stored on the disk drive as well as limited in the speed at which the hard disk drives can store the data.

When creating a network that includes a number of different computer system it may be desirable to evaluate the selected computer systems before they are actually implemented in the network environment. By evaluating the systems prior to actually implementing them in the network environment, trouble spots can be identified and corrected. This can result in a substantial cost savings as systems that unduly impede performance can be upgraded or can be excluded from a network configuration.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of simulating network connections. The method includes generating a transaction by invoking a method model of a service model. The transaction includes representations of network interactions. A sequence of actions is created, the actions define network hardware activities including network actions performed by one or more source computer models, one or more network models, and one or more destination computer models. The sequence of actions is applied to network hardware device models to simulate network connectivity.

Another embodiment includes a method of simulating network connections. The method includes referencing a performance scenario defining device model interconnections and service deployments on computer models. The performance scenario further defines sites to which computer models belong. Referencing the performance scenario is performed to determine the topology of the performance scenario. An inter-site routing table is constructed based on the topology of the performance scenario to facilitate network action mapping when simulating the performance scenario.

Another method illustrated herein is a method of defining a performance scenario model for modeling network interactions. The method includes defining device model characteristics including characteristics of networking capabilities for host computer models and network models. The method further includes defining deployment of one or more services of an application model to one or more computer host device models. Network interconnectivity is defined between device models to allow service models to be accessed by network actions by device models different than the computer host device models.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One example illustrated herein is directed to simulating an application deployed in a distributed environment. The application may be simulated using a distributed application model. The distributed application model may include service models, which include method models for each type of transaction belonging to that service. Each method model includes a description of specific hardware activities performed such as processor cycles, disk I/O operations, and network I/O operations The distributed application model may also include client application models. For example, a distributed application model for Microsoft Exchange Server may include a client application model of Outlook users. The client application model includes a description of the transaction types which can be generated.

Device models may be used to simulate the specific hardware activities specified in the method models. For example, a computer device model may include processor device models, disk device models, and/or network device models. Each of these device models may include information specifying a latency for hardware activities simulated by the device model. Thus, the hardware activities in the method models can be applied to specific device models.

The distributed application model and device models may be instantiated in a performance scenario which defines the configuration of the device models (e.g., the particular bandwidth of a NIC), the mapping of application model services (e.g., a database application) to computer models, the mapping of application model sub-services (e.g., data files and log files of a database application) to device models, and the network connectivity between computer models. The performance scenario also defines the configuration of client application models. This configuration includes client profile data. Client profile data determines property values of generated transactions. For example, in the case of a distributed application model of Microsoft Exchange Server, the client profile data for a client application model of an Outlook mail client may specify the number of emails sent per unit time per user and the average byte size of each email. Client application models are the sources for transaction generation. Each transaction in a client application model specifies the methods of distributed application model services which need to be invoked once the transaction is generated. For example, a client application model may be configured to generate RequestWebpage transactions at a rate of twelve transactions per second. The request webpage transaction may invoke a GetHomePage method on a first server computer device model. The GetHomePage method may specify certain hardware actions such as a given number of CPU cycles, and a given number of disk reads and/or writes of a particular size. In addition, the GetHomePage method may invoke other methods of other services on the same first server computer device model or on another second server computer device model. These other methods may specify hardware activities to be simulated by device models.

Notably, when client applications are modeled on computer device models that are different than the server computer device models, and when server computer device models invoke services deployed on other server computer device models, a simulation of communication between the computer device-models should be performed. The embodiments described herein below illustrate methods of simulating network communications for an application in a distributed environment.

Simulating network communications includes providing functionality for determining what computer model and network model connections should be made to complete a transaction. This may be accomplished by creating and referencing various routing tables. For example, an inter-site routing table may provide a reference for determining sites, where a site is a collection of local resources such as computer models and local network models, that are connected together so that a determination can be made concerning what site "hops" should be taken for a message to travel from a computer model in a source site to a computer model in a destination site. In one embodiment, the inter-site routing table may include costs associated with hops such that optimal hops can be taken. The costs can be summarized as an index number, and may take into account factors such as available bandwidth, latency, operational cost, reliability, conflicting uses, security, etc. The inter-site routing table will be discussed in more detail below in an illustrative example.

Another reference table that may be used to determine network routing for simulation is a computer-to-network map. A computer-to-network map indexes computer models to network models. Additionally, services and client applications of the distributed application model along with other performance scenario data, may be included in the mapping so that it can be determined if it is appropriate to use the computer model for a particular networking purpose. An example is illustrated below.

Yet another reference table that may be used to determine network routing for simulation is a network-to-computer map. This map indexes networks to computer models so a determination can be made of what computer model to next add to an action chain. Services of the distributed application model can also be indexed in this map to determine the appropriateness of selecting a particular computer model.

Figure 1:
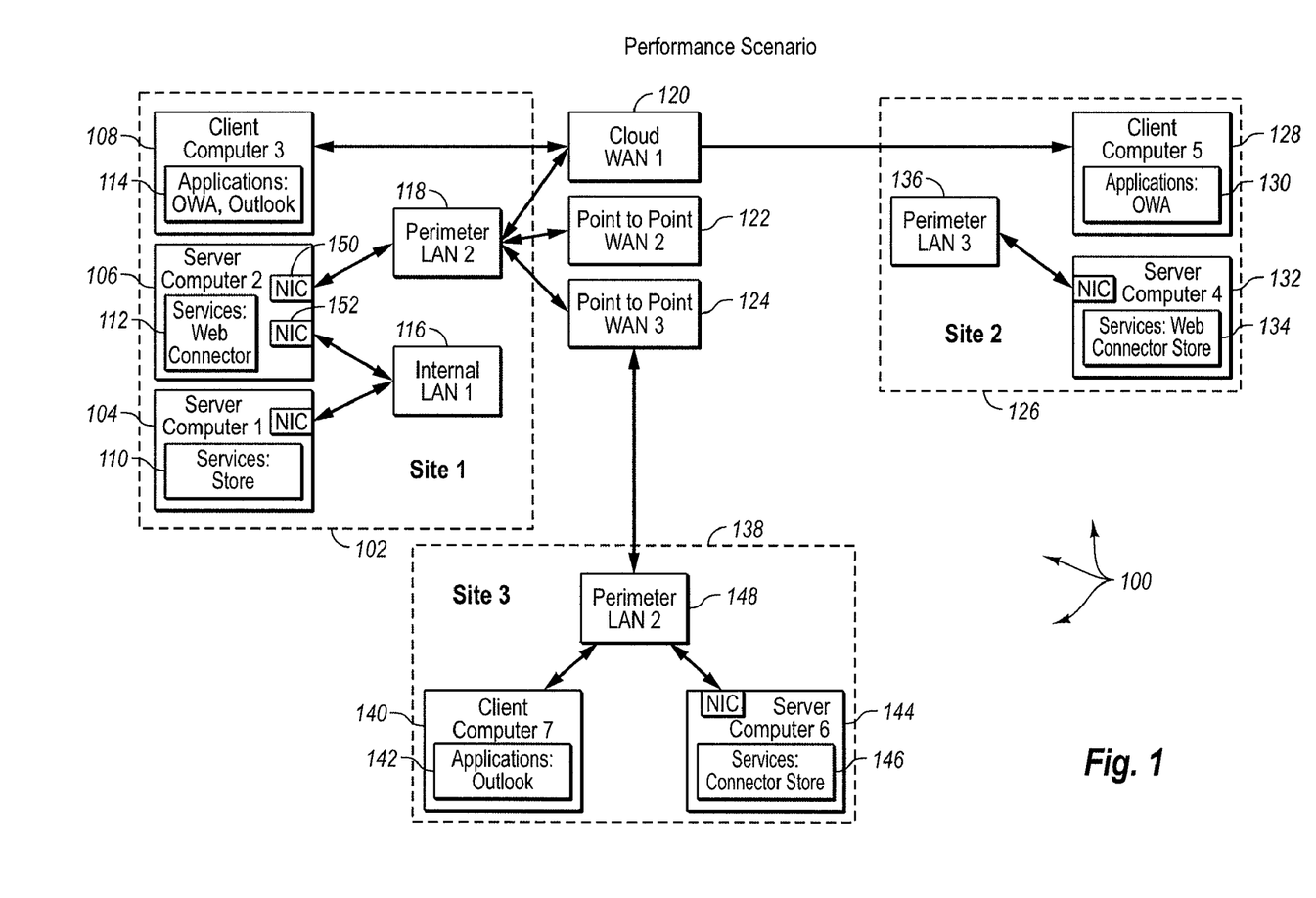
FIG. 1 illustrates a performance scenario including a model of interconnected computer models and network models.

Referring now to FIG. 1, a graphical example of a performance scenario 100 defining device model interconnections and application deployment is illustrated. The particular example illustrated in FIG. 1 is directed to an email application including Exchange server applications, Outlook client applications, and Outlook Web Application (OWA) client applications. The full versions of these programs are available from Microsoft Corporation of Redmond Wash.

FIG. 1 illustrates a number of clients and servers organized into sites and interconnected via various local area network (LAN) and wide area network (WAN) network connections. For example, site 1 102 includes a Server Computer model 1 104, and a Server Computer model 2 106. The Client Computer model 3 108 does not physically reside in Site 1 102, but is affiliated with Site 1 102. In this example, the Server Computer models have one or more services deployed on them and the Client Computer model has one or more applications deployed on it. For example, the Server Computer model 1 104 includes services 110 which includes a store service. Server Computer model 2 includes services 112 which include web and connector services. To help facilitate understanding of this example, the functionality of these services can be simplistically interpreted as follows: A store service saves messages in a user mailbox, a web service proxies messages from OWA clients to a store service, and a connector service relays messages between sites. Client Computer model 3 108 includes applications 114 which includes OWA and Outlook. Notably, in other embodiments, servers and clients may include services and/or applications instantiated together. Site 1 102 also includes two LAN models, Internal LAN model 1 116, and Perimeter LAN model 2 118. Internal LAN model 1 116 provides network connectivity for the server models, Server Computer model 1 104 and Server Computer model 2 106, within site 1 102. Perimeter LAN model 2 118 provides network connectivity beyond site 1 102 to other sites.

FIG. 1 further illustrates that the computer models in site 1 102 can be connected to computer models in other sites. This may be accomplished by connecting the computer models in site 1 102, either directly or through a Perimeter LAN model to a WAN model. For example, FIG. 1 illustrates three WAN models including Cloud WAN model 1 120, Point to Point WAN model 2 122, and Point to Point WAN model 3 124. The Client Computer model 3 108 is connected to computer models in Site 1 102 directly through the Cloud WAN model 1 120. Server Computer model 2 112 is connected to computer models external to Site through the Perimeter LAN model 2 118, which connects to all three WAN models including Cloud WAN model 1 120, Point to Point WAN model 2 122, and Point to Point WAN model 3 124. The Client Computer model 5 128 does not physically reside in Site 2 126, but is affiliated with Site 2 126. The Client Computer model 5 128 includes applications 130 which includes an OWA application. Site 2 126 includes a Server Computer model 4 132, which includes services 134. The services 134 includes web, connector, and store services. The Client Computer model 128 is connected to computer models in site 2 126 via a direct link to the Cloud WAN model 1 120. The Server Computer model 4 132 connects to computer models external to the site 2 126 through a Perimeter LAN model 3 136 which connects to the Cloud WAN model 1 120 and the Point to Point WAN model 122.

Site 3 138 shown in FIG. 1 also includes a Client Computer model 7 140, which includes applications 142. The applications 142 includes Outlook. A Server Computer model 6 144 is included in site 3 138. The Server Computer model 6 144 includes services 146, which includes connector and store services. The Server Computer model 6 144 is connected to external computer models through a Perimeter LAN model 4 148.

The computer network is configured during specification of the performance scenario. A performance scenario contains sites and links between sites defined by WAN models. A WAN model configuration can represent a point to point connection, or it can represent a cloud such as the Internet with unlimited connections. The model of a point-to-point connection assumes that the bandwidth of the link connecting WAN endpoints is solely dedicated to network communications between these endpoints. Each site contains computer models and LAN models. A LAN model can be an internal network or a perimeter network Computer models which require secure separation from a WAN model are typically only connected to an Internal LAN model. Computer models which require access to computer models in different sites are connected to a Perimeter LAN model. A single computer model can be connected to multiple LAN models and/or WAN models.

Each connection established between a computer model and a LAN model instantiates a NIC device model within the computer model. If multiple connections are established between the same computer model and same LAN model, then multiple NIC models are instantiated and emulate NIC teaming functionality. The configuration of the NIC model specifies its bandwidth and duplex mode. For example, server computer 2 106 includes two NIC models 150 and 152 corresponding to the two connections to the perimeter LAN 2 118 and Internal LAN 1 116 respectively.

After a site is created in the performance scenario 100, its Perimeter LAN model may be connected to the Perimeter LAN model in a different site via a point to point WAN model or a cloud WAN model. If a point to point WAN model is used, then the following configuration parameters may be specified: duplex mode, link speed, and packet latency between Perimeter LAN models. If a cloud WAN model is used, then the following configuration parameters are specified: duplex mode and link speed between perimeter LAN models and the cloud WAN model. Note that in the above examples, link speed may be specified in an asymmetric fashion. In other words, the link may be faster in one direction than the other direction.

Figure 6A:
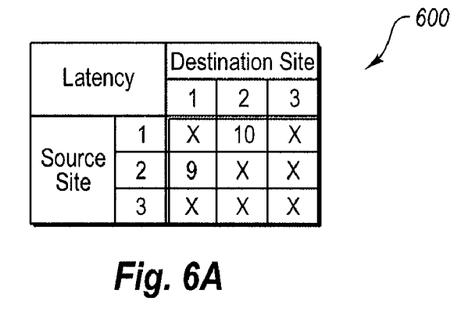
FIG. 6A illustrates a cloud WAN latency table for the example of FIG. 1 useful for determining latencies and selecting network paths.
Figure 6B:
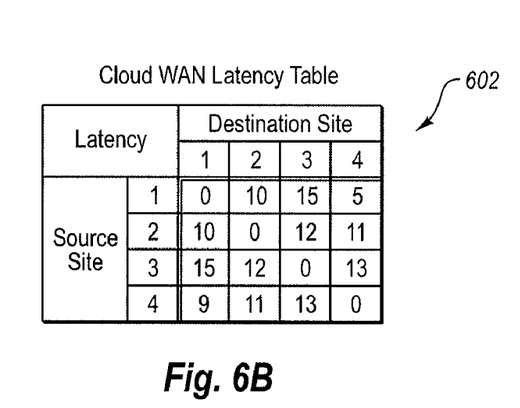
FIG. 6B illustrates another example of a cloud WAN latency table.

Additionally, the configuration of a cloud WAN model may contain a latency table which specifies packet latencies between different sites that contain perimeter network models which are connected to the cloud WAN model. FIG. 6A illustrates a Cloud WAN model latency table 600 for the performance scenario 100 illustrated in FIG. 1. A latency table not associated with the example of FIG. 1 is illustrated in FIG. 6B which illustrates a Cloud WAN model latency table 602 for a Cloud WAN model in a different performance scenario which contains four sites. Notably, this latency table is not the latency table for the example of FIG. 1. Nonetheless, the latency table 600 is instructive. In this example, each site in the performance scenario associated with the latency table 602 is connected to the WAN cloud model associated with this latency table. Note that the table data in this example is not directionally symmetric since the latency from site 4 to site 1 is 9 milliseconds, and the latency from site 1 to site 4 is 5 milliseconds.

The simulation engine constructs an inter-site routing table for the performance scenario 100. The inter-site routing table specifies the next site that a transaction must visit in cases where inter-site routing occurs. The routing table can be based on network optimization objectives such as shortest path or minimum cost.

Figure 2:
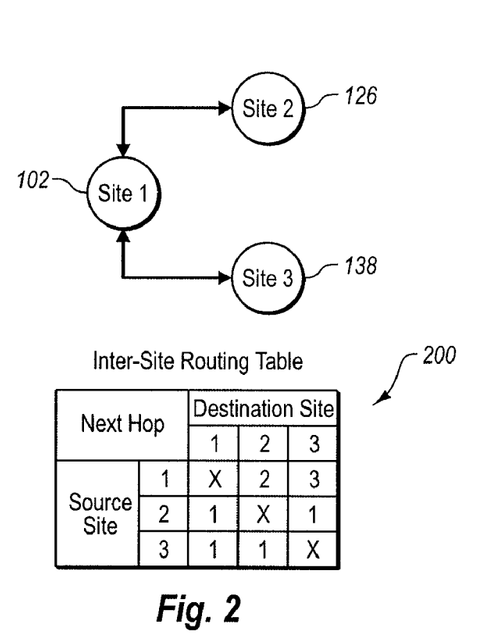
FIG. 2 illustrates an inter-site routing table useful in determining a next hop for simulating network activities.
Figure 8:
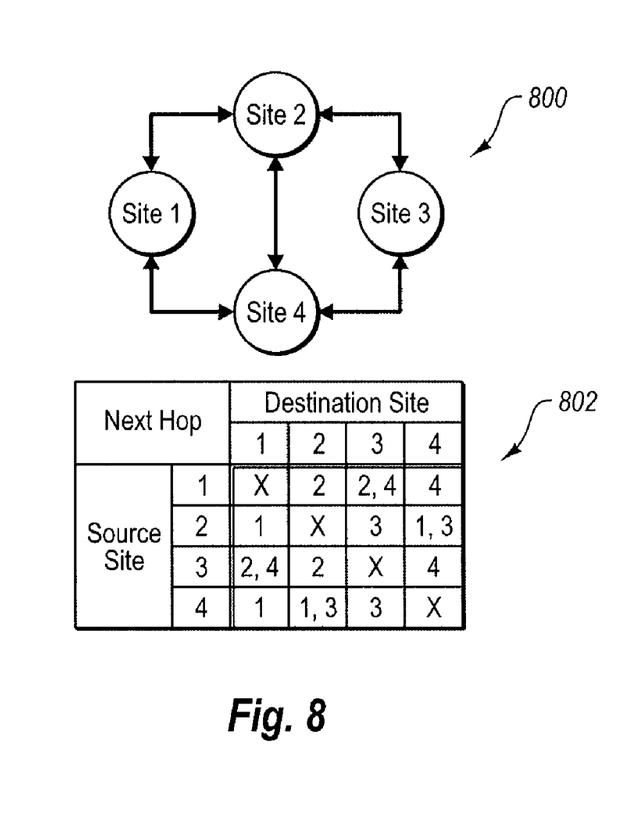
FIG. 8 illustrates another example of an inter-site routing table.
Figure 9:
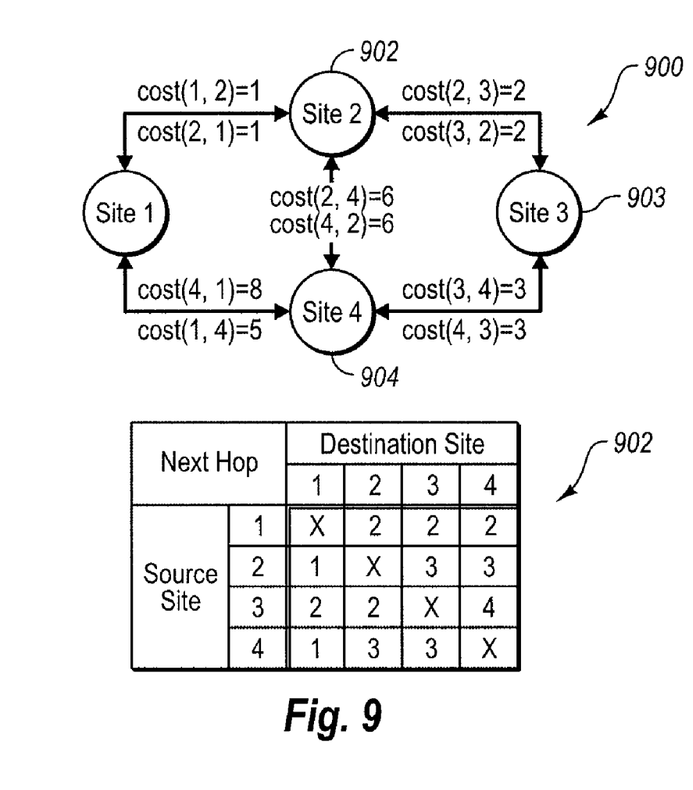
FIG. 9 illustrates an example of an inter-site routing table that includes costs associated with site hops.

Referring now to FIG. 2, a shortest path inter-site routing table 200 for the example illustrated in FIG. 1 is shown. If a transaction in Site 2 126 has a destination in Site 3 138, then the routing table specifies that Site 1 102 must first be visited, and subsequently Site 3 138 may be reached. As illustrated, the inter-site routing table 200 is a somewhat trivial example because there are only three sites 102, 126, and 138 shown in FIG. 1. However, more complex examples may exist with more sites where intermediate sites must be traversed to arrive at a destination site and where more than one intermediate site may lie along the shortest path. Examples of this are illustrated in FIGS. 8 and 9. In particular, FIG. 8 illustrates a site topology 800 with four interconnected sites, and a shortest path inter-site routing table 802. FIG. 9 illustrates a site topology 900 where costs are associated with each connection between sites, and an associated cost based inter-site routing table 902. Referring to FIG. 9, suppose a transaction needs to be routed from Site 4 904 to Site 2 902. Even though the shortest path is from Site 4 904 to Site 2 902 directly, the cost(4,2) is 6 units whereas the total cost in routing via Site 3

903 is cost(4,3)+cost(3,2)=3 units+2 units=5 units Therefore, the route via Site 3 903 is used.

Figure 3:
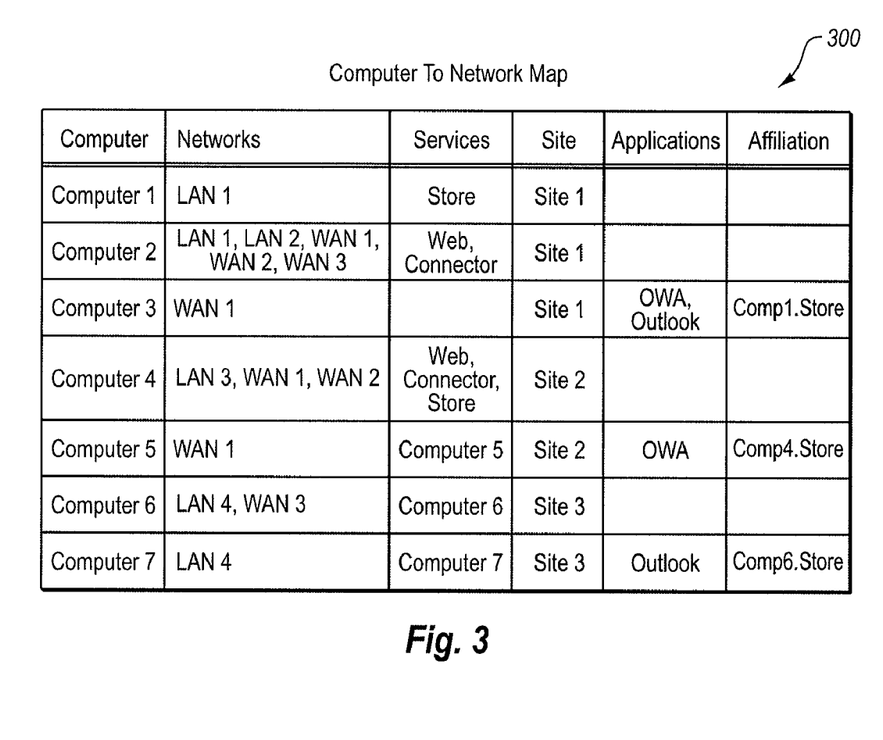
FIG. 3 illustrates a computer to network map useful for selecting a network from a source computer.
Figures 4, 5:
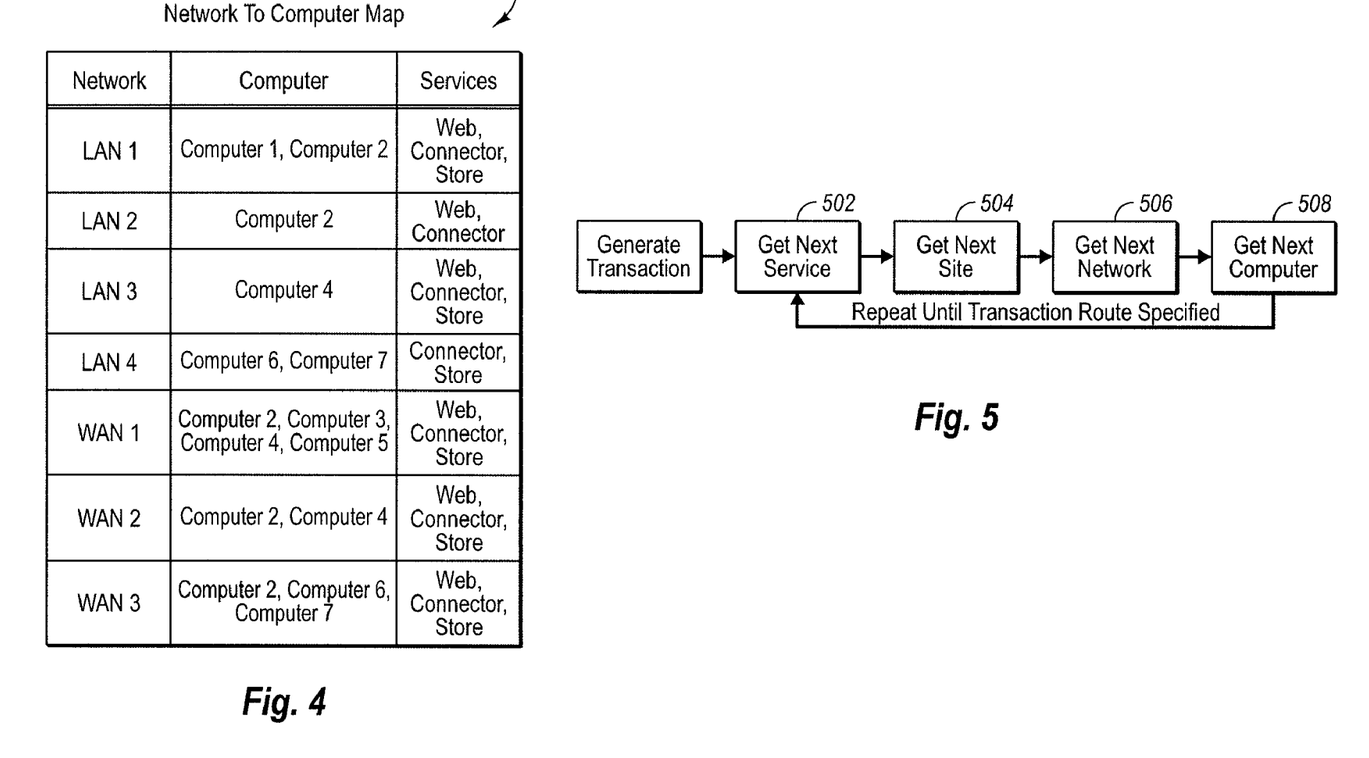
FIG. 4 illustrates a network to computer map useful for selecting a computer from a network.
FIG. 5 illustrates actions that may be performed to construct a chain of hardware actions to simulate network actions.

Referring now to FIG. 3, an example of a computer-to-network map 300 derived from network configuration in FIG. 1 is illustrated. The functionality of the computer-to-network map 300 will be explained in more detail below. Similarly, FIG. 4 illustrates an example of network-to-computer map 400 derived from network configuration in FIG. 1.

Illustrating now an example of simulating network activities on the performance scenario 100, transaction sources may be specified by clients. For example, Client Computer model 3 108 includes an OWA application. The performance scenario 100 may specify that the Client Computer model 3 generates a send mail transaction 12 times per second. Notably, in a real world perspective, this is an extremely high rate of sending mail messages. However, clients in a performance scenario may be utilized to implement client virtualization. Client virtualization allows one client model to model a number of real world clients. So while it may seem unrealistic for a single client to generate 12 send email transactions per second, it is not at all unrealistic for 1000 aggregated clients to generate 12 send email transactions per second. Thus, the Client Computer model 3 108 may virtualize a number of clients. Notably, simulations of large distributed applications are not typically performed to evaluate the utilization of individual clients, but rather are performed to evaluate utilization of server systems, storage systems, network interconnections, overall latencies, and the like. Virtualizing clients does not affect the ability to evaluate these factors.

A simulation engine generates workload by generating transactions and specifying their route. The transaction route specifies an ordered sequence of computer and network (LAN model or WAN model) configurations beginning and ending with a computer model configuration. Each computer model except the last one points to the next network model (LAN model or WAN model) in the configuration sequence, and each network model (LAN model or WAN model) points to the next computer model in the configuration sequence.

A client application model, such as OWA and Outlook in the example shown, has a profile which defines transaction properties, and a service affiliation which affects routing and scheduling logic in the simulation. Client application models are mapped transparently to a client computer model based on the site affiliation and the connectivity location specified in the performance scenario 100. During workload generation the simulation engine selects a client computer model and generates a transaction belonging to a client application model. The origin of the transaction is the client computer model. The transaction context carries its destination which is based on profile parameters and distributed application model logic.

For example, Client Computer model 3 108 is a client computer model with an OWA application that is affiliated to the store service on Server Computer model 1 104. The simulation engine generates an OWA send mail transaction on Client Computer model 3 108 with destination on the store service on Server Computer model 4 132. The destination is determined as follows. The distributed application model (that is, the overall distributed application model and not the client application model) specifies that OWA send mail transactions terminate in a store service or the Internet. Furthermore, the distributed application; model parameterizes a mail locality distribution, and the client profile specifies the distribution values. The simulation engine queries the mail locality distribution, and determines that the transaction is bound for a site different than Site 1 102. Site 2 126 and Site 3 138 both have store services, and the simulation engine selects Site 2 138 randomly. The random selection is done according to a weighted probability. The probability of selecting Site 2 126 or Site 3 138 is weighted according to the number of mailboxes belonging to Site 2 126 and Site 3 138.

The simulation engine generates the transaction route by querying the distributed application model, inter-site routing table 200, network-to-computer map 400 and the computer-to-network map 300. This may be done in an iterative process if there are multiple sites, network models, and/or computer models to be traversed. For example FIG. 5 illustrates a flow diagram 500 illustrating iterative acts that may be performed in generating a transaction route.

For example, at 502, the simulation engine queries the distributed application model to determine the next service required by the transaction. The required service may be constrained by site affiliation. The simulation engine determines if the current, site is the site containing the required service. If this is not true, then as illustrated at 504 the simulation queries the inter-site routing table to locate the next site required by the transaction.

At 506, the simulation engine queries the computer-to-network map to locate networks which are connected to computer models with the required service. If more than one such network is located, then a priority based scheduling policy is invoked to select the next network.

At 508, the simulation engine queries the network-to-computer map 400 to locate computer models which are connected to networks with the required service. If more than one such computer model is located, then a load balancing scheduling policy may be invoked to select the next computer model.

For example, the distributed application model specifies logic to express the requirement that OWA send mail transactions must first be processed by a web service in the site containing the affiliated store service, then processed by the affiliated store service, and finally processed by the destination store service. Furthermore, routing between the affiliated store service and destination store service must be processed by connector services along a route that minimize site hops.

Continuing with the present example, the distributed application model specifies that OWA send mail first requires a web service from a computer model in the affiliated site. Client Computer model 3 108 is affiliated with Site 1 102 and Site 1 102 contains a web service, so the routing table is not queried. The computer-to-network map 300 specifies that Client Computer model 3 108 can only access Cloud WAN model 1 120, SO Cloud WAN model 1 120 is the network selected. Next, the network-to-computer map 400 specifies that Cloud WAN model 1 120 can access Computer models 2 106, 3 108, 4 132, and 5 128. Server Computer model 2 106 is the only computer model containing a web service in Site 1 102, so Server Computer model 2 106 is selected. If Site 1 102 contained an additional computer model having a web service, then the simulation engine would select a computer model based on a scheduling policy such as round robin, random, weighted random, etc. Note that Computer model 4 132 also contains a web service, but is not considered because it does not belong to the affiliated site. The transaction route generated thus far is Computer model 3 to WAN model 1 to Computer model 2.

Continuing with the example, the distributed application model specifies that OWA send mail now requires the affiliated store service which is at Site 1 102, Server Computer model 1 104. Server Computer model 2 106 is contained in Site 1 102 and Site 1 102 contains Server Computer model 1 104, so the routing table is not queried. The computer-to-network map 300 specifies that Computer model 2 106 can access Internal LAN model 1 116, Perimeter LAN model 2 118, Cloud WAN model 1 120, Point to Point WAN model 2 122, and Point to Point WAN model 3 124. Internal LAN model 1 116 is the only network that can access Server Computer model 1 110, so Internal LAN model 1 116 is selected. Next, the network-to-computer map 400 specifies that Internal LAN model 1 116 can access Computer models 1 and 2. Server Computer model 1 104 contains the affiliated store service, so Server Computer model 1 104 is selected. The transaction route generated thus far is Client Computer model 3 108 to Cloud WAN model 1 120 to Server Computer model 2 106 to Internal LAN model 1 116 to Server Computer model 1 104.

Continuing with the example, the distributed application model specifies that OWA send mail now requires a connector service because the destination service is the store service mapped to Server Computer model 4 132 in site 2 126. Note that a connector service will continue to be required until Computer model 4 is reached. The inter-site routing table 200 is queried because the destination service is not contained in Site 1 102. The inter-site routing table 200 selects Site 2 126 as the next hop. Note that Site 3 138 is also accessible from Site 1 102, but it is not on the shortest path and is therefore not considered. The computer-to-network map 300 specifies that Server Computer model 1 104 can only access Internal LAN model 1 116, so Internal LAN model 1 116 is selected. Next, the network-to-computer map specifies than Internal LAN model 1 116 can access Server Computer models 1 104 and 2 106. Server Computer model 2 106 contains a connector service, so Server Computer model 2 106 is selected. If additional computer models with a con-hector service were connected to Internal LAN model 1 116, then the simulation engine would select a computer model based on a scheduling policy such as round robin, random, weighted random, etc. The transaction route generated thus far is Client Computer model 3 108 to Cloud WAN model 1 120 to Server Computer model 2 106 to Internal LAN model 1 116 to Server Computer model 1 104 to Internal LAN model 1 116 to Server Computer model 2 106.

Continuing with the example, the distributed application model specifies that OWA send mail still requires a connector service because the destination service is not located on Server Computer model 2 106. Site 2 remains designated as the next hop. The computer-to-network specifies that Server Computer model 2 106 can access Internal LAN model 1 116, Perimeter LAN model 2 118, Cloud WAN model 1 120, Point to Point WAN model 2 122, and Point to Point WAN model 3 124. Cloud WAN model 1 120 and Point to Point WAN model 2 122 are the only networks that can access computer models with a connector service in the site designated as the next hop. A scheduling policy based on minimum latency may be used to select between Cloud WAN model 1 120 and Point to Point WAN model 2 122. In the present example 10 milliseconds is the latency modeled for Cloud WAN model 1 120 between Site 1 102 and Site 2 126 based on the latency table in FIG. 6A. The latency in Point to Point WAN model 2 122 is 5 milliseconds as specified by the Point to Point WAN model 2 122 configuration in the performance scenario 100. Therefore, Point to Point WAN model 2 122 is selected since its packet latency is smallest. Next, the network-to-computer map 400 specifies that Point to Point WAN model 2 122 can access Server Computer models 2 106 and 4 132 Server Computer model 2 106 and Server Computer model 4 132 both contain the connector service, but Server Computer model 4 132 is in the site designated as the next hop, so Server Computer model 4 132 is selected. The transaction route generated thus far is Client Computer model 3 108 to Cloud WAN model 1 120 to Server Computer model 2 106 to Internal LAN model 1 116 to Server Computer model 1 104 to Internal LAN model 1 116 to Server Computer model 2 106 to Point to Point WAN model 2 122 to Computer model 4. Because the destination service, i.e. the store service on Server Computer model 4 132 at site 2 126 is on Server Computer model 4 132, the transaction terminates and the route is fully specified.

After workload generation completes, the simulation engine evaluates device models to determine action latencies. An action describes the workload of a computation, disk I/O, or network communication for a single transaction. In one embodiment, each network action latency calculation includes a source computer model, a network model, and a destination computer model. The computer model may contain one or more NIC device models. The network model can be a LAN model or a WAN model. The LAN model may contain a model of a network switch device. In the case of communication over a LAN, the LAN model manages scheduling communication actions onto the NIC models in the computer models and any device models contained in the LAN model such as a network switch device model. In the case of communication over a WAN, the WAN model manages scheduling communication actions onto the NIC models in the computer models and the WAN link models. The WAN model may contain one or more WAN link device models. The WAN model may also contain a specification of the packet latency between the computers it connects.

A latency is calculated for each set, where a set includes a source computer model, a network model, and a destination computer model. For example, in the present example, latencies are calculated for the sets of Computer model 3, WAN model 1, and Computer model 2; Computer model 2, LAN model 1, and Computer model 1; Computer model 1, LAN model 1, and Computer model 2; Computer model 2, WAN model 2, and Computer model 4. Once the network latencies for each of these sets are calculated, the latencies are added to the latencies for each of the other sets to arrive at the overall network latency of transaction.

To calculate the network latency for each set, the individual latencies are calculated for each of the NIC model in the source computer model, device models in the LAN or WAN model, and the NIC model in the destination computer model. The LAN or WAN model manages assembly of individual latencies for each set as follows. In the case of a LAN model, the partial latency for the set is the longest latency of the latency due to the NIC model in the source computer model, the NIC model in the destination computer model, and the LAN switch model. The total latency for the set is the sum of the packet latency in the LAN and the partial latency of the set from the previous calculation. The packet latency in a LAN is assumed to be negligible and therefore is usually neglected. In the case of a WAN model, the partial latency for the set is the longest latency of the latency due to the NIC model in the source computer model, the NIC model in the destination computer model, and the WAN link model. The total latency for the set is the sum of the packet latency in the WAN and the partial latency from the previous calculation. The partial latency uses the longest of the latencies due to the NIC in the computer model, the NIC in the destination computer model, and the device models in the LAN or WAN models, because the network interaction is assumed to be a stream of data such that the longest latency is the limiting factor.

The simulation engine is configured such that the latencies calculated at each of the individual models takes into account latencies due to conflicting uses of resources. For example, if multiple network actions are directed to a particular network hardware device model, the network hardware device model will have an increased latency due to the loading and conflicting resources.

Figure 7A:
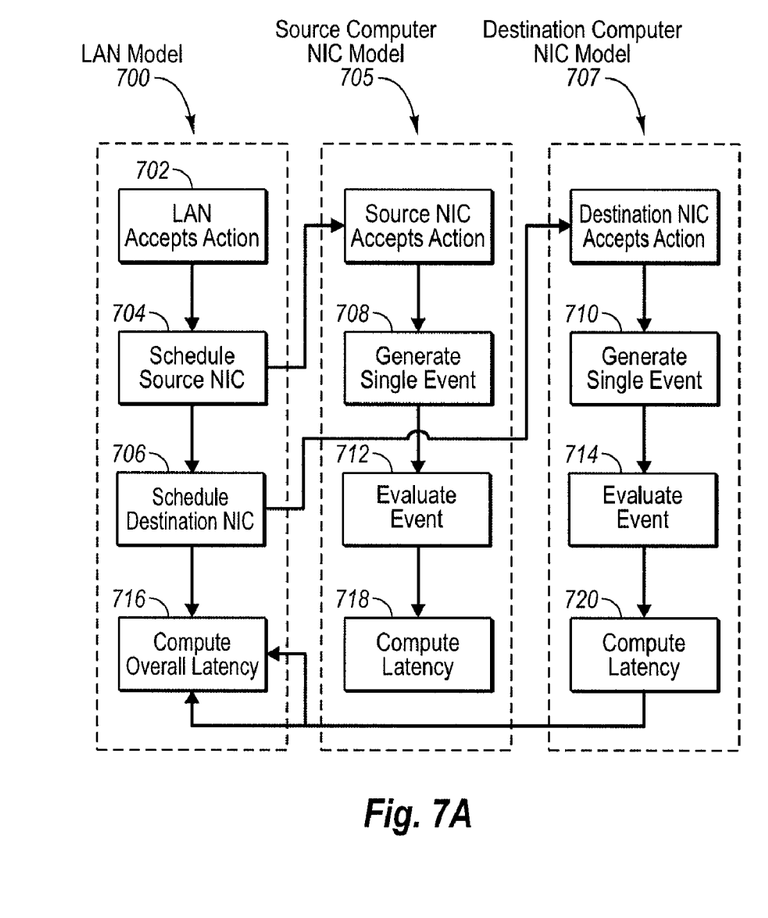
FIG. 7 illustrates a flow-chart of actions that can be performed to generate and calculate overall transaction latencies in a LAN environment.
Figure 7B:
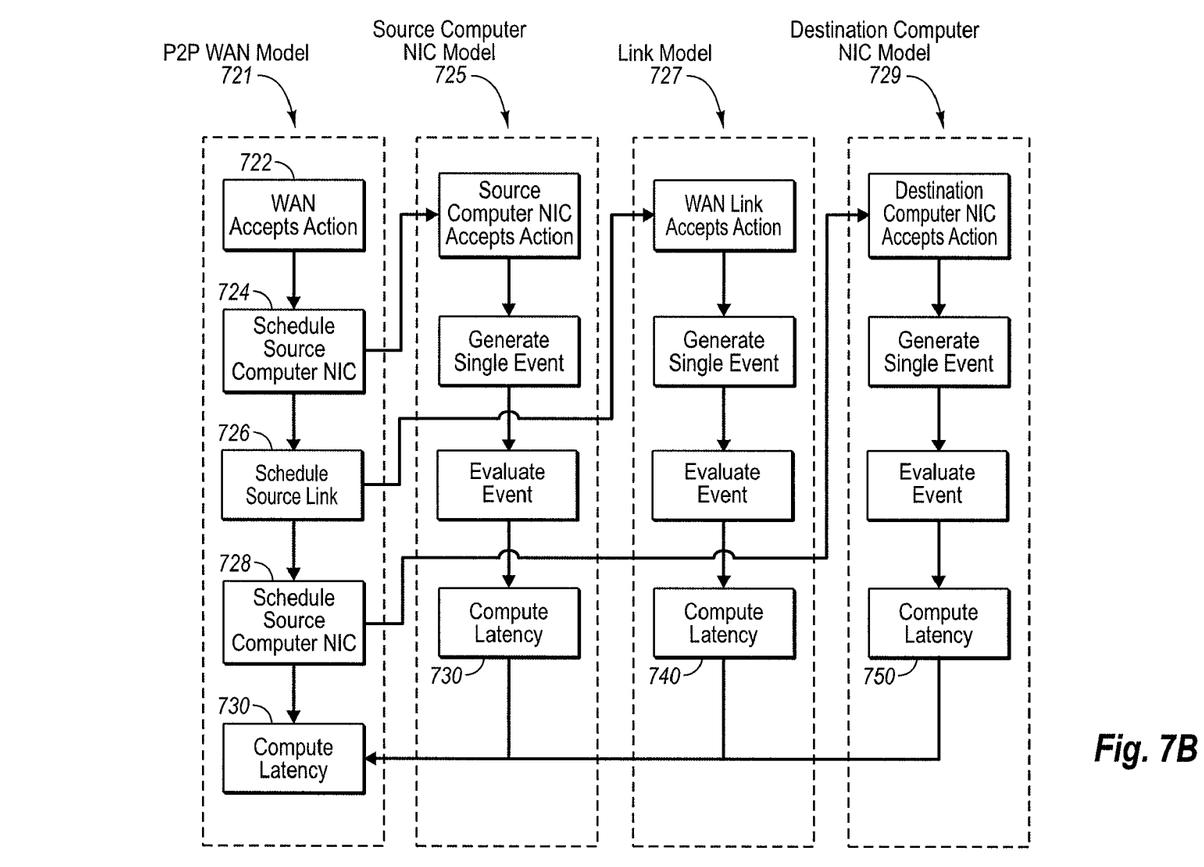

Referring now to FIG. 7, an example of device model scheduling is illustrated. The simulation engine schedules a communication action sequentially on each LAN model or WAN model configuration in the transaction route. The LAN model or WAN model configuration connects the computer model configuration of the transaction source with the computer model configuration of the transaction destination. The source and destination computer models may be at intermediate points in the transaction route. The simulation engine queries the distributed application model to determine the workload of the communication action between the source and destination computer models. For example, the workload may be described by some number of bytes.

FIG. 7 shows a LAN model 700. At 702, the LAN model 700 accepts a communication action from the simulation engine, such as sending of a certain size of network data. After the LAN model 700 accepts the communication action, at 704 and 706 the LAN model 700 schedules the source computer NIC model and destination computer NIC model. A MC is identified as a source if the computer model it connects is a transaction source, and a NIC is identified as a destination if the computer model it connects is a transaction destination. The configuration of a MC model is parameterized by its bandwidth and duplex mode. The LAN model specifies a scheduling policy to select a NIC model when multiple choices exist in the same computer. Multiple choices may exist because of multiple connections to the LAN model. Scheduling policies include round robin, random selection, and load balancing based on utilization. If the NIC configuration is half-duplex, then a single device descriptor is allocated to process communication actions which are sent and received. That is, communication actions which are sent and received share the same NIC bandwidth. If the link configuration is full-duplex, then sender and receiver device descriptors are allocated which separately process communication actions according to whether the action is sent or received. That is, communication actions which are sent do not share the same NIC bandwidth with communication actions which are received. In such cases, the send descriptor is scheduled if the NIC is in a source computer, and the receive descriptor is scheduled if the NIC is in a destination computer.

The NIC models each generate one event for each communication action as shown at 708 and 710. The event workload is initialized to the byte size of the communication action.

After the event is generated it is scheduled for evaluation. The workload of the event is processed by a "slot" to evaluate the event-time-to-live as illustrated at 712 and 714. An event time-to-live used in defining latency is updated iteratively and accounts for protracted processing time due to resource sharing by other concurrently executing events. The event-time-to-live for the NIC model at a given instant of simulation clock time is a function of remaining workload of the event, the bandwidth of the NIC model configuration, and the number of concurrently executing events. The maximum number of concurrently executing events is controlled by the "slot" count. In one embodiment, the "slot" count, i.e., number of simultaneous execution units, for the NIC is configured with the maximum integer value to approximate an unlimited number of concurrent network I/O. In another embodiment, the "slot" count may be set to any limit imposed by a particular kind of NIC configuration. If the number of concurrent events being processed exceeds the "slot" count during an interval of simulation clock time, then all or a limited number of subsequent events may be temporarily queued during this time, and the remainder of subsequent events may have their processing terminated to simulate network buffer overflow.

Latency is then calculated for each NIC model. Computed latencies 718 and 720 are given by the amount of simulation clock time elapsed after the events generated in 708 and 710 are scheduled for evaluation and until the event-time-to-live reaches zero in 712 and 714. As described previously, the overall latency calculated at 716 is the greater of the latency calculated at 718 and at 720 added to any packet latency in the LAN.

The foregoing also applies to a point-to-point WAN model. At 702, the WAN model accepts a communication action from the simulation engine, such as sending of a certain size of network data. After the WAN model accepts the communication action, at 702, the WAN model schedules the source computer NIC model, WAN link model 704, and destination computer NIC model 706. The modeling procedure for these NIC models proceeds in the same fashion as with NIC models already described. The modeling procedure also specifies a bandwidth and duplex mode. Furthermore, the WAN model may contain multiple WAN link models. In such cases, the WAN model selects a WAN link model according to a scheduling policy such as round robin, random selection, or load balancing based on utilization. As described previously, the overall latency calculated at 716 is the greater of the latencies calculated at 718 & 720, added to the packet latency between sites. Note that the modeling procedure for a WAN cloud model proceeds in similar fashion as with the point-to-point WAN model except noting that two different WAN link models are evaluated instead of only one. This is because the WAN cloud model contains one WAN link model which connects the perimeter network in the source site to the WAN cloud, and the WAN cloud model contains a second WAN link model which connects the perimeter network in the destination site to the WAN cloud.

Figure 10:
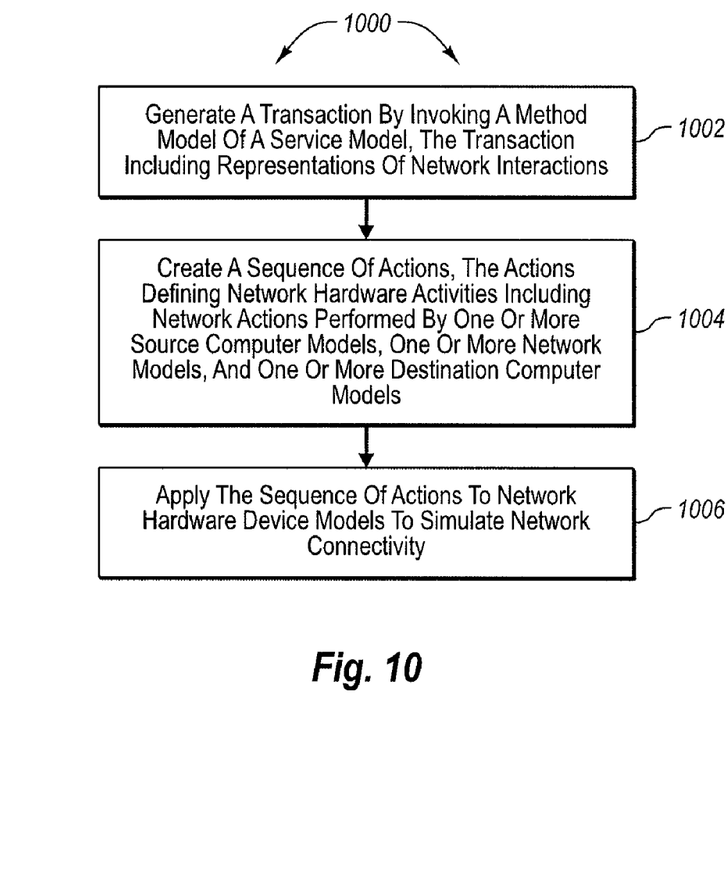
FIG. 10 illustrates of method of simulating network activities.

Referring now to FIG. 10, a method 1000 of simulating network connections is illustrated. The method includes generating a transaction by simulating a method model of a service model (act 1002). The transaction includes representations of network interactions. For example, as described in the example above, a transaction may invoke a service for sending mail on a network.

Generating a transaction may be performed at a rate dictated by a client computer model. For example, the client computer model may include a client application model that specifies a transaction and the number of transactions per time unit. For example, as illustrated previously, the client model may specify a number of send mail transactions per second. A workload generator can then generate transactions from the client computer model at the specified rate. The client computer model may be configured to virtualize a plurality of client computers by specifying transactions being performed at a rate appropriate for a number of client computers aggregated together. For example, a single client computer model may specify a transaction generation rate such that the single client computer model can be used to simulate multiple clients.

The method 1000 further includes creating a sequence of actions (act 1004). The actions define network hardware activities including network actions performed by one or more source computer models, one or more network models, and one or more destination computer models. For example, one sequence of actions may include a source computer model sending a given amount of data. The given amount of data may travel in a particular direction on a network model such as a LAN or WAN. The sequence may further include a destination computer model receiving the given amount of data. Creating a sequence of actions may include referencing an inter-site routing table to determine a next site to facilitate selection of a network model and a destination computer model to simulate network hardware activities. Additionally, creating a sequence of actions may include referencing a network-to-computer map to facilitate selection of a destination computer model to simulate network hardware activities. Further, creating a sequence of actions may include referencing a computer-to-network map to facilitate selection of a network model to simulate network hardware activities.

The sequence of actions is applied to network hardware device models to simulate network connectivity (act 1006).

The method 1000 may further include calculating a latency for network hardware activities. In one embodiment, this may be performed by calculating a latency for a source computer model, calculating a latency for a destination computer model, calculating a latency for a network model, and adding the packet latency to the longest of the latency due to the source computer model, the latency due to the destination computer model, and the latency due to the network model.

Figure 11:
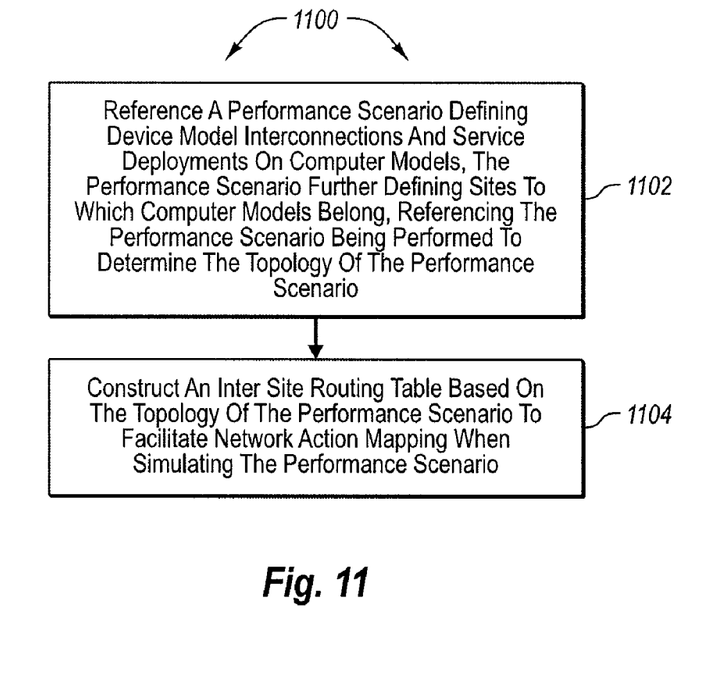
FIG. 11 illustrates a method of simulating network activities.

Referring now to FIG. 11, another method 1100 of simulating network connections. The method includes referencing a performance scenario defining device model interconnections and service deployments on computer models (act 1102). The performance scenario also defines sites to which computer models belong. Referencing the performance scenario is performed to determine the topology of the performance scenario. The method 1100 further includes constructing an inter-site routing table based on the topology of the performance scenario to facilitate network action mapping when simulating the performance scenario (act 1104).

The method 1100 may further include constructing a network-to-computer map to facilitate selection of a destination computer model to simulate network hardware activities. Additionally, a computer-to-network map may be constructed to facilitate selection of a network model to simulate network hardware activities.

A network action map including a mapping of network hardware activities may be created. The map may be created by referencing the inter-site routing table. The network action map defines network hardware activities including network actions performed by one or more source computer models, one or more network models, and one or more destination computer models.

The method 1100 may be performed such that referencing a performance scenario includes referencing a client computer model defining a transaction source and such that creating a network action map includes creating a network action map to simulate the transaction source defined in the client computer model. The client computer model may define the transaction as being performed at a particular rate. As illustrated above, the rate may be for example, transactions per second. The particular rate may be selected to be of a rate to facilitate client virtualization such that the client computer model is able to model a number of client computers.

Figure 12:
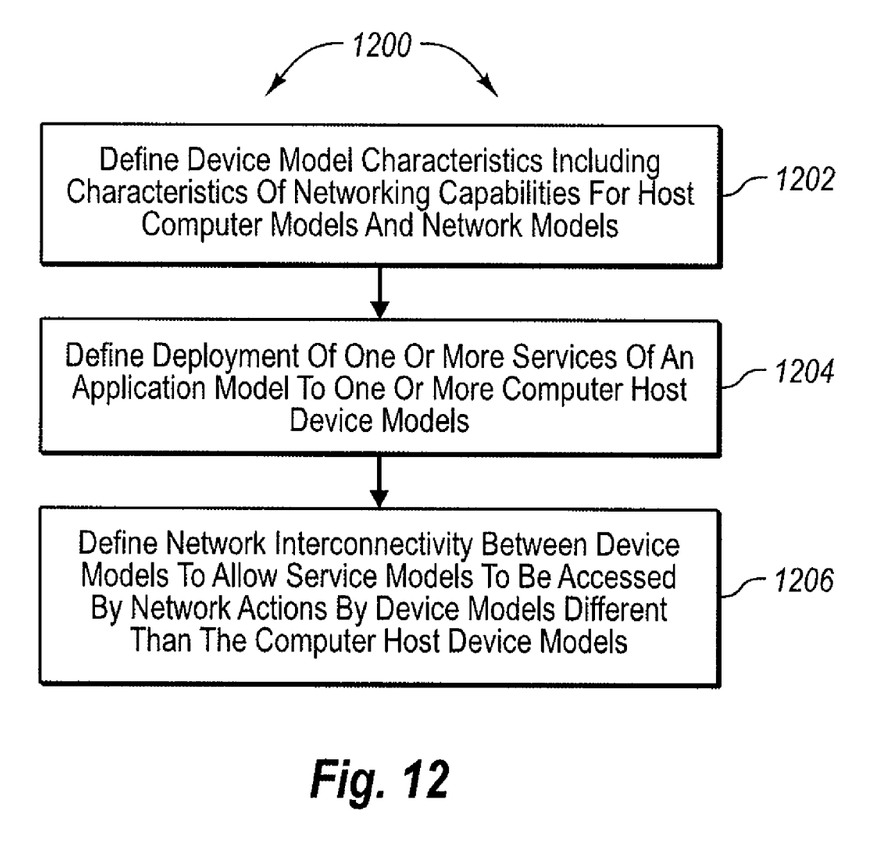
FIG. 12 illustrates a method of constructing a model for simulating network activities.

Referring now to FIG. 12, a method 1200 of defining a performance scenario model for modeling network interactions is illustrated. The method includes defining device model characteristics including characteristics of networking capabilities for host computer models and network models (act 1202).

The method 1200 further includes defining deployment of one or more services of an application model to one or more computer device models (act 1204). For example, an application model may include service models and service models may include method models describing particular hardware activities. The service models can be defined in the performance scenario as being deployed on one of the computer models.

The method 1200 further includes defining network interconnectivity between device models to allow service models to be accessed by network actions by device models different than the computer device models (act 1206). For example, a computer model may have networking characteristics defined as being connected to a particular network model. Other computer models connected to the particular network model allows for connectivity to be simulated between the computer models.

The method 1200 may further include defining one or more application models on one or more client computer models. The application models may specify transaction sources. The transactions may invoke one or more service models. In one embodiment, the transactions may be specified as occurring at a given rate over time. Some embodiments allow the rate to be specified such that it is appropriate to virtualize a plurality of client computer models.

Embodiments may also include computer-readable media for carrying or having computer-executable instructions or data structures stored thereon. Such computer-readable media can be any available storage media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable transmission medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of simulating network connections, the method comprising:

in a computer, generating a transaction by invoking a method model of a service model, the transaction including representations of network interactions;

creating a sequence of actions, the actions defining network hardware activities including network actions performed by one or more source computer models, one or more network models, and one or more destination computer models, wherein creating the sequence of actions comprises at least one of (a) referencing an inter-site routing table to determine a next site to facilitate selection of the next network model and next computer model to simulate network hardware activities, (b) referencing a network-to-computer map to facilitate selection of a next destination computer model to simulate network hardware activities, or (c) creating a sequence of actions comprises referencing a computer-to-network map to facilitate selection of a next network model to simulate network hardware activities; and applying the sequence of actions to network hardware device models to simulate network connectivity.

2. The method of claim 1, further comprising calculating a latency for network hardware activities.

3. The method of claim 2, wherein calculating a latency for network hardware activities comprises:
calculating a latency for a source computer model;
calculating a latency for a destination computer model;
calculating a packet latency for a network model;
adding the longest of the latencies due to the source computer model, the destination computer model, and the network model to the packet latency between the computer models.

4. The method of claim 3, wherein calculating a latency for network hardware activities comprises using an underlying resource contention model for the source computer model, the destination computer model, and the network model.

5. The method of claim 1, wherein creating the sequence of actions comprises referencing the inter-site routing table to determine the next site to facilitate selection of the next network model and next computer model to simulate network hardware activities.

6. The method of claim 1, wherein creating the sequence of actions comprises referencing the network-to-computer map to facilitate selection of the next destination computer model to simulate network hardware activities.

7. The method of claim 1, wherein creating the sequence of actions comprises referencing the computer-to-network map to facilitate selection of the next network model to simulate network hardware activities.

8. The method of claim 1, wherein generating a transaction is performed at a rate dictated by a client computer model, the client computer model including a client application model specifying a transaction source and the number of transactions per unit time.

9. The method of claim 8, wherein the client computer model is configured to virtualize a plurality of client computers by specifying transactions being performed at a rate appropriate for a plurality of client computers aggregated together.

10. Computer readable storage media comprising computer executable instructions which, when executed by a processor of a computing system, cause the computing system to perform the method recited in claim 1.

11. The method of claim 1, wherein applying the sequence of actions to network hardware device models to simulate network connectivity comprises:
accepting an action at a LAN model;
scheduling a source computer network interface card (NIC) model for the action;
scheduling a destination computer MC model for the action;
accepting the action at the source computer NIC model;
accepting the action at the destination computer MC model;
generating a first event at the source computer NIC model based on the action;
generating a second event at the destination computer NIC model based on the action;
evaluating the first event at the source computer NIC model; and
evaluating the second event at the destination computer NIC model.

12. The method of claim 1, wherein applying the sequence of actions to network hardware device models to simulate network connectivity comprises:
accepting an action at a point-to-point WAN model;
scheduling a source computer network interface card (NIC) model for the action;
scheduling a destination computer MC model for the action;
scheduling a WAN link model for the action;
accepting the action at the source computer NIC model;
accepting the action at the destination computer MC model;
accepting the action at the WAN link model;
generating a first event at the source computer MC model based on the action;
generating a second event at the destination computer NIC model based on the action;
generating a third event at the WAN link model based on the action;
evaluating the first event at the source computer NIC model;
evaluating the second event at the destination computer NIC model; and
evaluating the third event at the WAN link model.

13. The method of claim 1, wherein applying the sequence of actions to network hardware device models to simulate network connectivity comprises:
accepting an action at a cloud WAN model;
scheduling a source computer network interface card (NIC) model for the action;
scheduling a destination computer MC model for the action;
scheduling a source WAN link model for the action;
scheduling a destination WAN link model for the action;
accepting the action at the source computer NIC model;
accepting the action at the destination computer MC model;
accepting the action at the source WAN link model;
accepting the action at the destination WAN link model;
generating a first event at the source computer MC model based on the action;
generating a second event at the destination computer NIC model based on the action;
generating a third event at the source WAN link model based on the action;
generating a fourth event at the destination WAN link model based on the action;
evaluating the first event at the source computer MC model;
evaluating the second event at the destination computer MC model;
evaluating the third event at the source WAN link model; and
evaluating the fourth event at the destination WAN link model.

14. A method of simulating network connections, the method comprising:

in a computer, referencing a performance scenario defining device model interconnections and service deployments on computer models, the performance scenario further defining sites to which computer models belong, referencing the performance scenario being performed to determine the topology of the performance scenario;

constructing a inter-site routing table based on the topology of the performance scenario to facilitate network action mapping when simulating the performance scenario; and constructing at least one of (a) a network-to-computer map to facilitate selection of a next computer model to simulate network hardware activities; or (b) a computer-to-network map to facilitate selection of a next network model to simulate network hardware activities.

15. The method of claim 14, further comprising constructing the network-to-computer map to facilitate selection of the next computer model to simulate network hardware activities.

16. The method of claim 14, further comprising constructing the computer-to-network map to facilitate selection of the next network model to simulate network hardware activities.

17. The method of claim 14, further comprising creating a network action map by referencing the inter-site routing table, the network action map defining network hardware activities including network actions performed by one or more source computer models, one or more network models, and one or more destination computer models.

18. The method of claim 17, wherein referencing a performance scenario comprises referencing a client computer model defining a transaction, and wherein creating a network action map comprises creating a network action map to simulate the transaction defined in the client computer model.

19. The method of claim 18, wherein the client computer model defines the transaction as being performed at a particular rate that is selected to be of a rate to facilitate client virtualization such that the client computer model is able to model a plurality of client computers.

20. A method of defining a performance scenario model for modeling network interactions, the method comprising:
in a computer, defining device model characteristics including characteristics of networking capabilities for host computer models and network models;
defining deployment of one or more services of an application model to one or more computer host device models; and
defining network interconnectivity between device models to allow service models to be accessed by device models different than the computer host device models; and
defining one or more application models on one or more client computer models, the application models specifying transactions, wherein the transactions invoke one or more service models.

21. The method of claim 20, wherein specifying transactions comprise specifying transactions as occurring at a given rate over time, wherein the rate specified is a rate appropriate to virtualize a plurality of client computer models.

22. A method of simulating network connections, the method comprising:
in a computer, generating a transaction by invoking a method model of a service model, the transaction including representations of network interactions;
creating a sequence of actions, the actions defining network hardware activities including network actions performed by one or more source computer models, one or more network models, and one or more destination computer models;
applying the sequence of actions to network hardware device models to simulate network connectivity; and
calculating a latency for network hardware activities, wherein calculating the latency for network hardware activities comprises:
calculating a latency for a source computer model;
calculating a latency for a destination computer model;
calculating a packet latency for a network model; and
adding the longest of the latencies due to the source computer model, the destination computer model, and the network model to the packet latency between the computer models.

23. A method of simulating network connections, the method comprising:
in a computer, generating a transaction by invoking a method model of a service model, the transaction including representations of network interactions, wherein generating a transaction is performed at a rate dictated by a client computer model, the client computer model including a client application model specifying a transaction source and the number of transactions per unit time;
creating a sequence of actions, the actions defining network hardware activities including network actions performed by one or more source computer models, one or more network models, and one or more destination computer models; and
applying the sequence of actions to network hardware device models to simulate network connectivity.

24. A method of simulating network connections, the method comprising:
in a computer, referencing a performance scenario defining device model interconnections and service deployments on computer models, the performance scenario further defining sites to which computer models belong, referencing the performance scenario being performed to determine the topology of the performance scenario;
constructing a inter-site routing table based on the topology of the performance scenario to facilitate network action mapping when simulating the performance scenario; and
creating a network action map by referencing the inter-site routing table, the network action map defining network hardware activities including network actions performed by one or more source computer models, one or more network models, and one or more destination computer models.

* * * * *